(12) United States Patent
Green et al.

(10) Patent No.: US 8,289,325 B2
(45) Date of Patent: Oct. 16, 2012

(54) MULTI-PASS SHADING

(75) Inventors: Robin James Green, Redwood City, CA (US); Axel Mamode, Mountain View, CA (US); Roy Tadashi Hashimoto, Redwood City, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 7 days.

(21) Appl. No.: 12/287,317

(22) Filed: Oct. 7, 2008

(65) Prior Publication Data

US 2009/0040222 A1 Feb. 12, 2009

Related U.S. Application Data

(63) Continuation of application No. 10/959,695, filed on Oct. 6, 2004.

(51) Int. Cl.
*G06T 15/50* (2011.01)
(52) U.S. Cl. .................................................. 345/426
(58) Field of Classification Search ................. None
See application file for complete search history.

(56) References Cited

U.S. PATENT DOCUMENTS

| | | | |
|---|---|---|---|
| 3,147,341 A | 9/1964 | Gibson | |
| 3,200,193 A | 8/1965 | Eiggs | |
| 3,717,345 A | 2/1973 | Banville | |
| 3,943,277 A | 3/1976 | Everly et al. | |
| 4,051,520 A | 9/1977 | Davidse et al. | |
| 4,068,847 A | 1/1978 | Lukkarila et al. | |
| 4,090,216 A | 5/1978 | Constable | |
| 4,116,444 A | 9/1978 | Mayer et al. | |
| 4,133,004 A | 1/1979 | Fitts | |
| 4,241,341 A | 12/1980 | Thorson | |
| 4,321,635 A | 3/1982 | Tsuyuguchi | |
| 4,355,334 A | 10/1982 | Fitzgibbon et al. | |

(Continued)

FOREIGN PATENT DOCUMENTS

CN 1201180 12/1998

(Continued)

OTHER PUBLICATIONS

Chan, E., Ng, R., Sen, P., Proudfoot, K., and Hanrahan, P. 2002. Efficient partitioning of fragment shaders for multipass rendering on programmable graphics hardware. In Proceedings of the ACM SIGGRAPH/EUROGRAPHICS Conference on Graphics Hardware (Saarbrucken, Germany, Sep. 1-2, 2002).*

(Continued)

*Primary Examiner* — Daniel Hajnik
(74) *Attorney, Agent, or Firm* — Carr & Ferrell LLP

(57) ABSTRACT

An application binary interface includes a descriptor specifying a binary shader for each pass of a multi-pass shader. The application binary interface also includes a graphics state of a graphics object for each pass of the multi-pass shader. The graphics state for the first pass is an initial graphics state of the graphics object. The graphics state for each subsequent pass specifies a change from the graphics state of a previous pass. The application binary interface further includes parameters for the binary shaders. The application binary interface links the binary shaders together based on the parameters. Further, the parameters of the binary shaders may be modified at run time to configure the multi-pass shader. The binary shader of each pass is then executed based on the graphics state and parameters of the pass to render the graphics object.

15 Claims, 7 Drawing Sheets

U.S. PATENT DOCUMENTS

| | | |
|---|---|---|
| 4,361,850 A | 11/1982 | Nishimura |
| 4,448,200 A | 5/1984 | Brooks et al. |
| 4,514,727 A | 4/1985 | Van Antwerp |
| 4,533,937 A | 8/1985 | Yamamoto et al. |
| 4,646,075 A | 2/1987 | Andrews et al. |
| 4,649,504 A | 3/1987 | Krouglicof et al. |
| 4,658,247 A | 4/1987 | Gharachorloo |
| 4,672,564 A | 6/1987 | Egli et al. |
| 4,675,562 A | 6/1987 | Herlein et al. |
| 4,677,569 A | 6/1987 | Nakano et al. |
| 4,683,466 A | 7/1987 | Holtey et al. |
| 4,685,054 A | 8/1987 | Manninen et al. |
| 4,685,146 A | 8/1987 | Fenster et al. |
| 4,709,231 A | 11/1987 | Sakaibara et al. |
| 4,727,365 A | 2/1988 | Bunker et al. |
| 4,737,921 A | 4/1988 | Goldwasser et al. |
| 4,757,525 A | 7/1988 | Matthews et al. |
| 4,807,158 A | 2/1989 | Blanton et al. |
| 4,817,005 A | 3/1989 | Kubota et al. |
| 4,843,568 A | 6/1989 | Krueger et al. |
| 4,860,197 A | 8/1989 | Langendorf et al. |
| 4,864,515 A | 9/1989 | Deck |
| 4,866,637 A | 9/1989 | Gonzalez-Lopez et al. |
| 4,901,064 A | 2/1990 | Deering |
| 4,905,147 A | 2/1990 | Logg |
| 4,905,168 A | 2/1990 | McCarthy et al. |
| 4,933,864 A | 6/1990 | Evans, Jr. et al. |
| 4,934,908 A | 6/1990 | Turrell et al. |
| 4,942,538 A | 7/1990 | Yuan et al. |
| 4,943,938 A | 7/1990 | Aoshima et al. |
| 4,952,917 A | 8/1990 | Yabuuchi |
| 4,956,794 A | 9/1990 | Zeevi et al. |
| 4,962,540 A | 10/1990 | Tsujiuchi et al. |
| 4,969,036 A | 11/1990 | Bhanu et al. |
| 4,980,823 A | 12/1990 | Liu |
| 5,014,327 A | 5/1991 | Potter et al. |
| 5,034,986 A | 7/1991 | Karmann et al. |
| 5,045,843 A | 9/1991 | Hansen |
| 5,057,744 A | 10/1991 | Barbier et al. |
| 5,064,291 A | 11/1991 | Reiser |
| 5,067,014 A | 11/1991 | Bergen et al. |
| 5,128,671 A | 7/1992 | Thomas, Jr. |
| 5,128,794 A | 7/1992 | Mocker et al. |
| 5,162,781 A | 11/1992 | Cambridge |
| 5,194,941 A | 3/1993 | Grimaldi et al. |
| 5,208,763 A | 5/1993 | Hong et al. |
| 5,212,888 A | 5/1993 | Cary et al. |
| 5,222,203 A | 6/1993 | Obata |
| 5,227,985 A | 7/1993 | DeMenthon |
| 5,230,623 A | 7/1993 | Guthrie et al. |
| 5,253,339 A | 10/1993 | Wells |
| 5,265,888 A | 11/1993 | Yamamoto et al. |
| 5,268,996 A | 12/1993 | Steiner et al. |
| 5,269,687 A | 12/1993 | Mott et al. |
| 5,274,560 A | 12/1993 | LaRue |
| 5,297,061 A | 3/1994 | Dementhon et al. |
| 5,305,389 A | 4/1994 | Palmer |
| 5,307,137 A | 4/1994 | Jones et al. |
| 5,335,557 A | 8/1994 | Yasutake |
| 5,351,090 A | 9/1994 | Nakamura |
| 5,354,202 A | 10/1994 | Moncrief et al. |
| 5,361,147 A | 11/1994 | Katayama et al. |
| 5,363,120 A | 11/1994 | Drumm |
| 5,366,376 A | 11/1994 | Copperman et al. |
| 5,367,615 A | 11/1994 | Economy et al. |
| 5,369,737 A | 11/1994 | Gholizadeh et al. |
| 5,387,943 A | 2/1995 | Silver |
| 5,446,714 A | 8/1995 | Yoshio et al. |
| 5,446,798 A | 8/1995 | Morita et al. |
| 5,448,687 A | 9/1995 | Hoogerhyde et al. |
| 5,450,504 A | 9/1995 | Calia |
| 5,469,193 A | 11/1995 | Giobbi et al. |
| 5,473,736 A | 12/1995 | Young |
| 5,526,041 A | 6/1996 | Glatt |
| 5,534,917 A | 7/1996 | MacDougall |
| 5,537,638 A | 7/1996 | Morita et al. |
| 5,548,667 A | 8/1996 | Tu |
| 5,550,960 A | 8/1996 | Shirman et al. |
| 5,555,532 A | 9/1996 | Sacha |
| 5,557,684 A | 9/1996 | Wang et al. |
| 5,559,950 A | 9/1996 | Cannon |
| 5,563,989 A | 10/1996 | Billyard |
| 5,572,261 A | 11/1996 | Cooper |
| 5,574,836 A | 11/1996 | Broemmelsiek |
| 5,577,179 A | 11/1996 | Blank |
| 5,577,913 A | 11/1996 | Moncrief et al. |
| 5,586,231 A | 12/1996 | Florent et al. |
| 5,590,248 A | 12/1996 | Zarge et al. |
| 5,598,297 A | 1/1997 | Yamanaka et al. |
| 5,611,000 A | 3/1997 | Szeliski et al. |
| 5,616,078 A | 4/1997 | Oh |
| 5,617,407 A | 4/1997 | Bareis |
| 5,630,033 A | 5/1997 | Purcell et al. |
| 5,631,697 A | 5/1997 | Nishimura et al. |
| 5,647,019 A | 7/1997 | Iino et al. |
| 5,649,032 A | 7/1997 | Burt et al. |
| 5,659,671 A | 8/1997 | Tannenbaum et al. |
| 5,660,547 A | 8/1997 | Copperman |
| 5,668,646 A | 9/1997 | Katayama et al. |
| 5,672,820 A | 9/1997 | Rossi et al. |
| 5,673,374 A | 9/1997 | Sakaibara et al. |
| 5,680,487 A | 10/1997 | Markandey |
| 5,684,887 A | 11/1997 | Lee et al. |
| 5,699,497 A | 12/1997 | Erdahl et al. |
| 5,704,024 A | 12/1997 | Voorhies et al. |
| 5,717,148 A | 2/1998 | Ely et al. |
| 5,717,848 A | 2/1998 | Watanabe et al. |
| 5,734,384 A | 3/1998 | Yanof et al. |
| 5,748,865 A | 5/1998 | Yamamoto et al. |
| 5,748,867 A | 5/1998 | Cosman et al. |
| 5,751,928 A | 5/1998 | Bakalash |
| 5,756,354 A | 5/1998 | Tzidon et al. |
| 5,757,360 A | 5/1998 | Nitta et al. |
| 5,760,781 A | 6/1998 | Kaufman et al. |
| 5,761,401 A | 6/1998 | Kobayashi et al. |
| 5,764,803 A | 6/1998 | Jacquin et al. |
| 5,769,718 A | 6/1998 | Rieder |
| 5,774,124 A | 6/1998 | Itoh et al. |
| 5,781,194 A | 7/1998 | Ponomarev et al. |
| 5,786,801 A | 7/1998 | Ichise |
| 5,793,376 A | 8/1998 | Tanaka et al. |
| 5,798,519 A | 8/1998 | Vock et al. |
| 5,805,170 A | 9/1998 | Burch |
| 5,805,745 A | 9/1998 | Graf |
| 5,805,782 A | 9/1998 | Foran |
| 5,808,617 A | 9/1998 | Kenworthy et al. |
| 5,808,619 A | 9/1998 | Choi et al. |
| 5,812,136 A | 9/1998 | Keondjian |
| 5,812,141 A | 9/1998 | Kamen et al. |
| 5,818,424 A | 10/1998 | Korth |
| 5,818,553 A | 10/1998 | Koenck et al. |
| 5,825,308 A | 10/1998 | Rosenberg |
| 5,831,623 A | 11/1998 | Negishi et al. |
| 5,852,443 A | 12/1998 | Kenworthy |
| 5,854,632 A | 12/1998 | Steiner |
| 5,856,844 A | 1/1999 | Batterman et al. |
| 5,864,342 A | 1/1999 | Kajiya et al. |
| 5,864,742 A | 1/1999 | Gasper et al. |
| 5,870,097 A | 2/1999 | Snyder et al. |
| 5,870,098 A | 2/1999 | Gardiner |
| 5,880,736 A | 3/1999 | Peercy et al. |
| 5,880,856 A | 3/1999 | Ferriere |
| 5,889,505 A | 3/1999 | Toyama et al. |
| 5,890,122 A | 3/1999 | Van Kleeck et al. |
| 5,894,308 A | 4/1999 | Isaacs |
| 5,899,810 A | 5/1999 | Smith |
| 5,903,318 A | 5/1999 | Demay et al. |
| 5,905,894 A | 5/1999 | De Bonet |
| 5,912,830 A | 6/1999 | Krech, Jr. et al. |
| 5,913,727 A | 6/1999 | Ahdoot |
| 5,914,724 A | 6/1999 | Deering et al. |
| 5,915,972 A | 6/1999 | Tada |
| 5,917,937 A | 6/1999 | Szeliski et al. |
| 5,922,318 A | 7/1999 | Bandman et al. |
| 5,923,381 A | 7/1999 | Demay et al. |
| 5,929,860 A | 7/1999 | Hoppe |
| 5,933,150 A | 8/1999 | Ngo et al. |

| | | |
|---|---|---|
| 5,933,535 A | 8/1999 | Lee et al. |
| 5,935,198 A | 8/1999 | Blomgren |
| 5,949,424 A | 9/1999 | Cabral et al. |
| 5,953,485 A | 9/1999 | Abecassis |
| 5,959,673 A | 9/1999 | Lee et al. |
| 5,963,209 A | 10/1999 | Hoppe |
| 5,966,133 A | 10/1999 | Hoppe |
| 5,977,977 A | 11/1999 | Kajiya et al. |
| 5,982,352 A | 11/1999 | Pryor |
| 5,982,390 A | 11/1999 | Stoneking et al. |
| 5,986,668 A | 11/1999 | Szeliski et al. |
| 5,987,164 A | 11/1999 | Szeliski et al. |
| 5,990,901 A | 11/1999 | Lawton et al. |
| 6,002,738 A | 12/1999 | Cabral et al. |
| 6,009,188 A | 12/1999 | Cohen et al. |
| 6,009,190 A | 12/1999 | Szeliski et al. |
| 6,010,403 A | 1/2000 | Adam et al. |
| 6,016,150 A | 1/2000 | Lengyel et al. |
| 6,018,347 A | 1/2000 | Willis |
| 6,018,349 A | 1/2000 | Szeliski et al. |
| 6,023,523 A | 2/2000 | Cohen et al. |
| 6,026,182 A | 2/2000 | Lee et al. |
| 6,031,934 A | 2/2000 | Ahmad et al. |
| 6,034,691 A | 3/2000 | Aono et al. |
| 6,034,692 A | 3/2000 | Gallery et al. |
| 6,034,693 A | 3/2000 | Kobayashi et al. |
| 6,035,067 A | 3/2000 | Ponticos |
| 6,037,947 A | 3/2000 | Nelson et al. |
| 6,040,842 A | 3/2000 | Wavish et al. |
| 6,044,181 A | 3/2000 | Szeliski et al. |
| 6,046,744 A | 4/2000 | Hoppe |
| 6,049,619 A | 4/2000 | Anandan et al. |
| 6,049,636 A | 4/2000 | Yang |
| 6,058,397 A | 5/2000 | Barrus et al. |
| 6,072,494 A | 6/2000 | Nguyen |
| 6,072,504 A | 6/2000 | Segen |
| 6,081,274 A | 6/2000 | Shiraishi |
| 6,100,898 A | 8/2000 | Malamy et al. |
| 6,101,289 A | 8/2000 | Kellner |
| 6,121,953 A | 9/2000 | Walker |
| 6,130,673 A | 10/2000 | Pulli et al. |
| 6,137,492 A | 10/2000 | Hoppe |
| 6,141,013 A | 10/2000 | Nelson et al. |
| 6,141,041 A | 10/2000 | Carlbom et al. |
| 6,155,924 A | 12/2000 | Nakagawa et al. |
| 6,157,386 A | 12/2000 | Wilde |
| 6,162,123 A | 12/2000 | Woolston |
| 6,172,354 B1 | 1/2001 | Adan et al. |
| 6,175,367 B1 | 1/2001 | Parikh et al. |
| 6,181,384 B1 | 1/2001 | Kurashige et al. |
| 6,181,988 B1 | 1/2001 | Schneider et al. |
| 6,200,138 B1 | 3/2001 | Ando et al. |
| 6,201,581 B1 | 3/2001 | Moriwake et al. |
| 6,203,426 B1 | 3/2001 | Matsui et al. |
| 6,208,347 B1 | 3/2001 | Migdal et al. |
| 6,220,962 B1 | 4/2001 | Miyamoto et al. |
| 6,222,555 B1 | 4/2001 | Christofferson et al. |
| 6,229,553 B1 | 5/2001 | Duluk, Jr. et al. |
| 6,233,291 B1 | 5/2001 | Shukhman et al. |
| 6,252,608 B1 | 6/2001 | Snyder et al. |
| 6,268,875 B1 | 7/2001 | Duluk, Jr. et al. |
| 6,273,814 B1 | 8/2001 | Komoto |
| 6,288,730 B1 | 9/2001 | Duluk, Jr. et al. |
| 6,313,841 B1 | 11/2001 | Ogata et al. |
| 6,313,842 B1 | 11/2001 | Tampieri |
| 6,319,129 B1 | 11/2001 | Igarashi et al. |
| 6,320,580 B1 | 11/2001 | Yasui et al. |
| 6,330,000 B1 | 12/2001 | Fenney et al. |
| 6,331,851 B1 | 12/2001 | Suzuki et al. |
| 6,342,885 B1 | 1/2002 | Knittel et al. |
| 6,348,921 B1 | 2/2002 | Zhao et al. |
| 6,353,272 B1 | 3/2002 | van der Hoeven |
| 6,356,263 B2 | 3/2002 | Migdal et al. |
| 6,356,288 B1 | 3/2002 | Freeman et al. |
| 6,361,438 B1 | 3/2002 | Morihira |
| 6,366,272 B1 | 4/2002 | Rosenberg et al. |
| 6,392,647 B1 | 5/2002 | Migdal et al. |
| 6,396,490 B1 | 5/2002 | Gorman |
| 6,400,842 B2 | 6/2002 | Fukuda |
| 6,411,298 B1 | 6/2002 | Goto et al. |
| 6,414,960 B1 | 7/2002 | Kuhn et al. |
| 6,417,836 B1 | 7/2002 | Kumar et al. |
| 6,421,057 B1 | 7/2002 | Lauer et al. |
| 6,426,720 B1 | 7/2002 | Ross et al. |
| 6,426,755 B1 | 7/2002 | Deering |
| 6,456,977 B1 | 9/2002 | Wang |
| 6,476,807 B1 | 11/2002 | Duluk, Jr. et al. |
| 6,488,505 B1 | 12/2002 | Hightower |
| 6,489,955 B1 | 12/2002 | Newhall, Jr. |
| 6,496,189 B1 | 12/2002 | Yaron et al. |
| 6,496,598 B1 | 12/2002 | Harman |
| 6,504,538 B1 | 1/2003 | Freund et al. |
| 6,529,206 B1 | 3/2003 | Ohki et al. |
| 6,529,875 B1 | 3/2003 | Nakajima et al. |
| 6,538,666 B1 | 3/2003 | Ozawa et al. |
| 6,545,663 B1 | 4/2003 | Arbter et al. |
| 6,554,707 B1 | 4/2003 | Sinclair et al. |
| 6,563,499 B1 | 5/2003 | Waupotitsch et al. |
| 6,571,208 B1 | 5/2003 | Kuhn et al. |
| 6,572,475 B1 | 6/2003 | Okabe et al. |
| 6,573,890 B1 | 6/2003 | Lengyel |
| 6,577,312 B2 | 6/2003 | Deering et al. |
| 6,578,197 B1 | 6/2003 | Peercy et al. |
| 6,585,599 B1 | 7/2003 | Horigami et al. |
| 6,594,388 B1 | 7/2003 | Gindele et al. |
| 6,597,363 B1 | 7/2003 | Duluk, Jr. et al. |
| 6,611,265 B1 | 8/2003 | Hong et al. |
| 6,639,594 B2 | 10/2003 | Zhang et al. |
| 6,646,639 B1 | 11/2003 | Greene et al. |
| 6,646,640 B2 | 11/2003 | Nagy |
| 6,650,329 B1 | 11/2003 | Koike |
| 6,652,376 B1 | 11/2003 | Yoshida et al. |
| 6,664,955 B1 | 12/2003 | Deering |
| 6,664,959 B2 | 12/2003 | Duluk, Jr. et al. |
| 6,680,746 B2 | 1/2004 | Kawai et al. |
| 6,686,924 B1 | 2/2004 | Mang et al. |
| 6,714,236 B1 | 3/2004 | Wada et al. |
| 6,717,576 B1 | 4/2004 | Duluk, Jr. et al. |
| 6,717,579 B1 | 4/2004 | Deslandes et al. |
| 6,717,599 B1 | 4/2004 | Olano |
| 6,720,949 B1 | 4/2004 | Pryor et al. |
| 6,738,059 B1 | 5/2004 | Yoshinaga et al. |
| 6,744,442 B1 | 6/2004 | Chan et al. |
| 6,750,867 B1 | 6/2004 | Gibson |
| 6,755,654 B2 | 6/2004 | Hightower |
| 6,764,403 B2 | 7/2004 | Gavin |
| 6,771,264 B1 | 8/2004 | Duluk et al. |
| 6,771,813 B1 | 8/2004 | Katsuyama |
| 6,778,181 B1 | 8/2004 | Kilgariff et al. |
| 6,781,594 B2 | 8/2004 | Day |
| 6,795,068 B1 | 9/2004 | Marks |
| 6,798,411 B1 | 9/2004 | Gorman et al. |
| 6,803,910 B2 | 10/2004 | Pfister et al. |
| 6,803,964 B1 | 10/2004 | Post et al. |
| 6,807,296 B2 | 10/2004 | Mishima |
| 6,825,851 B1 | 11/2004 | Leather |
| 6,850,236 B2 | 2/2005 | Deering |
| 6,850,243 B1 | 2/2005 | Kilgariff et al. |
| 6,853,382 B1 | 2/2005 | Van Dyke et al. |
| 6,854,632 B1 | 2/2005 | Larsson |
| 6,864,895 B1 | 3/2005 | Tidwell et al. |
| 6,903,738 B2 | 6/2005 | Pfister et al. |
| 6,912,010 B2 | 6/2005 | Baker et al. |
| 6,917,692 B1 | 7/2005 | Murching et al. |
| 6,928,433 B2 | 8/2005 | Goodman et al. |
| 6,956,871 B2 | 10/2005 | Wang et al. |
| 6,962,527 B2 | 11/2005 | Baba |
| 6,995,788 B2 | 2/2006 | James |
| 7,006,101 B1 | 2/2006 | Brown et al. |
| 7,072,792 B2 | 7/2006 | Freifeld |
| 7,079,138 B2 | 7/2006 | Day |
| 7,081,893 B2 | 7/2006 | Cerny |
| 7,085,722 B2 | 8/2006 | Luisi |
| 7,101,284 B2 | 9/2006 | Kake et al. |
| 7,113,193 B2 | 9/2006 | Marks |
| 7,162,314 B2 | 1/2007 | Fay et al. |
| 7,180,529 B2 | 2/2007 | Covannon et al. |
| 7,214,133 B2 | 5/2007 | Jen et al. |

| | | | | | | |
|---|---|---|---|---|---|---|
| 7,233,904 B2 | 6/2007 | Luisi | | JP | 2007271999 | 10/1995 |
| 7,251,315 B1 | 7/2007 | Quinton | | JP | 2007334664 | 12/1995 |
| 7,293,235 B1 | 11/2007 | Powers et al. | | JP | 9265379 | 10/1997 |
| 7,304,667 B2 | 12/2007 | Watanabe et al. | | JP | 10055454 | 2/1998 |
| 7,333,150 B2 | 2/2008 | Cooper | | JP | 11070273 | 3/1999 |
| 7,339,589 B2 | 3/2008 | Annunziata | | JP | 2000137828 | 5/2000 |
| 7,589,723 B2 | 9/2009 | Wang et al. | | JP | 2000311251 | 7/2000 |
| 7,636,126 B2 | 12/2009 | Mallinson | | JP | 2000218036 | 8/2000 |
| 7,777,746 B2 | 8/2010 | Annunziata | | JP | 2000233072 | 8/2000 |
| 7,877,262 B2 | 1/2011 | Luisi | | JP | 2000237453 | 9/2000 |
| 7,880,746 B2 | 2/2011 | Marks et al. | | JP | 200338993 | 12/2000 |
| 7,920,209 B2 | 4/2011 | Mallinson | | JP | 2001029649 | 2/2001 |
| 2001/0048434 A1 | 12/2001 | Brown | | JP | 3244798 | 10/2001 |
| 2002/0018063 A1 | 2/2002 | Donovan et al. | | JP | 2002159749 | 6/2002 |
| 2002/0041335 A1 | 4/2002 | Taraci et al. | | JP | 2001079263 | 3/2003 |
| 2002/0047937 A1 | 4/2002 | Wells | | JP | 2008165784 | 7/2008 |
| 2002/0068626 A1 | 6/2002 | Takeda et al. | | JP | 4616330 | 10/2010 |
| 2002/0080136 A1 | 6/2002 | Kouadio | | KR | 20000072753 | 12/2000 |
| 2002/0107070 A1 | 8/2002 | Nagy | | WO | 9418790 | 8/1994 |
| 2002/0130866 A1 | 9/2002 | Stuttard | | WO | 9802223 | 1/1998 |
| 2002/0140703 A1 | 10/2002 | Baker et al. | | WO | 9853443 | 11/1998 |
| 2002/0162081 A1 | 10/2002 | Solomon | | WO | 0010130 | 2/2000 |
| 2002/0167518 A1 | 11/2002 | Migdal et al. | | WO | 0129768 | 4/2001 |
| 2003/0009748 A1 | 1/2003 | Glanville et al. | | WO | 0182626 | 11/2001 |
| 2003/0043163 A1 | 3/2003 | Day | | WO | 2005040900 | 5/2005 |
| 2003/0058238 A1 | 3/2003 | Doak et al. | | WO | 2006033360 | 3/2006 |
| 2003/0112238 A1 | 6/2003 | Cerny et al. | | WO | 2008018943 | 2/2008 |
| 2003/0117391 A1 | 6/2003 | Olano | | WO | 2008058271 | 5/2008 |
| 2003/0142232 A1 | 7/2003 | Albean | | WO | 2008058271 | 8/2008 |
| 2003/0179220 A1 | 9/2003 | Dietrich et al. | | | | |
| 2004/0003370 A1* | 1/2004 | Schenk et al. ............. 717/100 | | | | |
| 2004/0051716 A1 | 3/2004 | Sevigny | | | | |
| 2004/0056860 A1 | 3/2004 | Collodi | | | | |
| 2004/0100582 A1 | 5/2004 | Stanger | | | | |
| 2004/0130550 A1 | 7/2004 | Blanco et al. | | | | |
| 2004/0130552 A1* | 7/2004 | Duluk et al. ............. 345/506 | | | | |
| 2004/0263636 A1 | 12/2004 | Cutler et al. | | | | |
| 2004/0268413 A1 | 12/2004 | Reid et al. | | | | |
| 2005/0001836 A1 | 1/2005 | Day | | | | |
| 2005/0019020 A1 | 1/2005 | Sato et al. | | | | |
| 2005/0024379 A1 | 2/2005 | Marks | | | | |
| 2005/0078116 A1 | 4/2005 | Sloan et al. | | | | |
| 2005/0090312 A1 | 4/2005 | Campbell | | | | |
| 2005/0243094 A1 | 11/2005 | Patel et al. | | | | |
| 2005/0253965 A1 | 11/2005 | Cooper | | | | |
| 2006/0015348 A1 | 1/2006 | Cooper et al. | | | | |
| 2006/0039017 A1 | 2/2006 | Park et al. | | | | |
| 2006/0071933 A1 | 4/2006 | Green et al. | | | | |
| 2006/0209210 A1 | 9/2006 | Swan et al. | | | | |
| 2006/0290810 A1 | 12/2006 | Mallinson | | | | |
| 2007/0106760 A1 | 5/2007 | Houh et al. | | | | |
| 2007/0257928 A1 | 11/2007 | Marks et al. | | | | |
| 2007/0279427 A1 | 12/2007 | Marks | | | | |
| 2008/0070655 A1 | 3/2008 | Tanabe | | | | |
| 2008/0268956 A1 | 10/2008 | Suzuki | | | | |
| 2009/0193453 A1 | 7/2009 | Cansler et al. | | | | |
| 2010/0029387 A1 | 2/2010 | Luisi | | | | |
| 2010/0053430 A1 | 3/2010 | Mallinson | | | | |
| 2011/0181776 A1 | 7/2011 | Mallinson | | | | |
| 2011/0205240 A1 | 8/2011 | Marks et al. | | | | |
| 2011/0249072 A1 | 10/2011 | Marks | | | | |

FOREIGN PATENT DOCUMENTS

| | | |
|---|---|---|
| DE | 19905076 | 5/2000 |
| EP | 448411 | 9/1991 |
| EP | 615386 | 9/1994 |
| EP | 789296 | 8/1997 |
| EP | 850673 | 7/1998 |
| EP | 1029569 | 8/2000 |
| EP | 1630754 | 3/2006 |
| EP | 1650706 | 4/2006 |
| GB | 2351637 | 1/2001 |
| GB | 2411065 | 8/2005 |
| JP | 59-002040 | 1/1984 |
| JP | 59-202779 | 11/1984 |
| JP | 61-131110 | 6/1986 |
| JP | H527779 | 4/1993 |
| JP | 6266854 | 9/1994 |
| JP | 7-160412 | 6/1995 |

OTHER PUBLICATIONS

Fernando, R. and Kilgard, M. J. 2003 The Cg Tutorial: the Definitive Guide to Programmable Real-Time Graphics. Addison-Wesley Longman Publishing Co., Inc., in Ch.1 sections 1.2 and 1.4, and in Appendix C section C.2.*

Palmer, Chriss et al., "Tile Based Games FAQ," GAMEDEV, Aug. 31, 2000.

Phong, Bui Tuong, "Illumination for Computer Generated Pictures," Communication of the ACM, 18(6), pp. 311-317, Jun. 1975.

Pratt, David R., "A Software Architecture for the Construction and Management of Real-Time Virtual Worlds", Jun. 1993, pp. 62-67.

Project Gotham Racing release information, Aug. 2, 2006, Gamespot.com, http://www.gamespot.com/xbox/driving/project gothamracing/similar.html?mode=versions.

Project Gotham Racing Screenshot, Avault, Nov. 14, 2001, http://www.avault.com/consoles/reviews/xbox/avscreenshot.asp?pic=pgr& num=5.

RoadBlasters Path Markers, MobyGames, Jan. 25, 2007, http://www.mobygames.com/game/nes/readblasters/screenshots/gameShotld,35174/.

RoadBlasters Release Information, GameSpot, Jan. 25, 2007, http://www.gamespot.com/nes/driving/roadblasters/index.html?q=roadblasters.

Rushmeier, et al., "Extending the Radiosity Method to Include Specularly Reflecting and Translucent Materialsm" ACM Transaction on Graphics, vol. 9, No. 1, Jan. 1990.

Russell, M. et al., "applications of Automatic Speech Recognition to Speech and Language development in Young Children", Proc of ICSLP, 1996.

Schlick, C., "A Survey of Shading and Reflectance Models," Computer Graphics Forum, Jun. 1994, pp. 121-132, vol. 13, No. 2.

Schlicke, C., "A Fast Alternative to Phong's Specular Model," Graphics Gems IV, pp. 385-386, 1994.

Screen Shot of a Civilization Building Game; Available at http://www.s2.com.br/s2arquivos/361/Imagens/2323 Image, jpg (accessed Oct. 11, 2005).

Screen Shot of a Civilization Building Game; Available at http://www.s2.com.br/s2arquivos/361/Imagens/2324 Image, jpg (accessed Oct. 11, 2005).

Screen Shot of a Flight Simulator, Available at http://foto.spullenbank.nl/common/img/00/00/03/31/.sub.—T33178.jpg.

Screen Shot of a Flight Simulator; Avalable at http://orbit.medphys.ucl.ac.uk/images/gallery64.jpg (accessed Oct. 11, 2005).

Screen Shot of a Role Playing Game; Available at http://images.fok.nl/upload/lotrrotk2.jpg (accessed Oct. 11, 2005).

Screen Shot of a Role Playing Game; Available at http://images.fok.nl/upload/lotrrotk3.jpg (accessed Oct. 11, 2005).

Segen et al., "Gesture VR: Vision-Based 3D Hand Interface for Spatial Interaction," Proceedings of Sixth ACM International Conference on Multimedia, 1998.

Sergen, et al., "Gesture VR: Vision-Based 3D Hand Interface for Spatial Interaction," p. 455-464, 1998.

Spagnoletti, Simon, Phillips Ambilight TV, Home Entertainment, engadget, Jul. 8, 2004.

Tang et al., "Blending Structured Graphics and Layout", Symposium on User Interface Software and Technology, Proceedings of the 7th Annual ACM Symposium on User Interface Software and Technology, Marina del Rey California, United States, pp. 167-173 (1994).

Thalmann, et al., "Interactive Computer Animation", 1996, Prentice Hall Europe, pp. 182-186.

The PlayStation 2 Books Riding Spirits Official Complete Guide (graphics), Japan, SoftBank Publishing, Sep. 6, 2003, First Edition, p. 005.

Voorhoies, D., et al., "Reflection Vector Shading Hardware", Computer Graphics Proceedings, annual conference Series 1994, Siggraph 94 conference Proceedings, ACM, 1994, pp. 163-166, New York, NY, USA.

Ware et al., "Reaching for Objects in VR: Displays:Lag and Frame Rate," ACM Transactions on Computer-Human Interaction, vol. 1, No. 4, Dec. 1994.

White, Stephen, "The Technology of Jak & Daxter," Game Developer's Conference, Mar. 6, 2003.

Agui, Takeshi et al., "Computer Graphics", Shokodo Co., Ltd., Jul. 1992, 1st ed., pp. 80-101 (Environment Mapping).

Aguilera, S et al., "Impaired Persons Facilities Based on a Multi-Modality Speech Processing System", Proc. On Speech & Language Tech., 1993.

Arons, B., "Authoring and Transcription Tools for Speech-Based Hypermedia", Proc. of American Voice I/O Society, 1991.

Arons, B., "Hyperspeech: Navigating in Speech-Only Hypermedia", Proc. of Hypertext, 1991.

Balakrishnan et al., "Exploring Interactive Curve and Surface Manipulation Using a Bend and Twist Sensitive Input Strip," Proc. of 1999 ACM symp. on Interactive 3D Graphics.

Balakrishnan et al., "Performance Differences in the Fingers, Wrist, and Forearm in Computer Input Control," Proc. of 1997 ACM Conf. on Human Factors in Computing Systems.

Balakrishnan et al., "The PadMouse: Facilitating Selection and Spatial Postioning for the Non-Dominant Hand," Proc. of 1998 ACM Conf. on Human Factors in Computing Systems.

Balakrsihnan et al., Exploring Bimanual Camera Control and Object Manipulation in 3D Graphics Interfaces,: Proc. of 1999 ACM Conf. on Human Factors in Computing Systems.

Bates, Jason, "Half-Life Review," IGN, Nov. 25, 1998.

Bennacef, S.K., "A Spoken Language System for Information Retrieval", Proc. of ICSLP, 1994.

Bizarre Creations, Project Gotham Racing Manual, 2001, Microsoft Corporation, pp. 1-27, http://www.gamemanuals.net/download/2d54fbeb2d3e8ca2224ebad31c1b257f/Project_Gotham_Racing_%28EN%029.pdf.

Blinn, J.F. et al., "Texture and Reflection in Computer Generated Images", Communications of the Association for Computing Machinery, ACM, Oct. 1976, pp. 542-547, vol. 19, No. 10, New York, NY USA.

Blinn, J.F., "Light Reflection Functions for Simulation of Clouds and Dusty Surfaces," ACM Graphics, vol. 16, No. 3, Jul. 1982.

Blinn, J.F., "Models of Light Reflection for Computer Synthesized Pictures", Proc. Siggraph 1977, Computer Graphics 11(2), pp. 92-198, Jul. 1977.

Calvert, Justin, SCEE's lastest plans for its EyeToy peripheral will effectively turn the PlayStation 2 into a videophone. First screens inside., SCEE announces EyeToy;Chat, Game Spot, http://www.gamespot.com/news/6095429.html., May 5, 2004.

Davenport, G. et al., "Cinematic Primitives for Multimedia", IEEE Computer Graphics and Applications (Aug. 1991), vol. 11, No. 4, pp. 67-74.

Dorsey, Julie O'B et al., Design and Simultaion of Opera Lighting and Projection Effects, Program of Computer Graphics, Computer Graphics, Jul. 1991, vol. 25, No. 4, New York.

European Examination Report mailed Jul. 27, 2010 in European patent application No. 04 256 331.2, filed Oct. 14, 2004.

Fitzmaurice et al., "Sampling, Synthesis, and Input Devices," Communications of the ACM, vol. 42, No. *, Aug. 1999.

Foley et al., "Computer Graphics: Principles and Practice", Oct. 1996, pp. 721-745.

Foley et al., "Computer Graphics: Principles and Practice", Second Edition in C, pp. 731, 1990.

Gauvain, J. L. et al., "Spoken LanguageComponent of the MASK Kiosk", Human Comfort and Security of Information Systems, 1995.

Gauvain, J.L. et al, "The LIMSI Continuous Speech Dictation System", Proc. ARPA Human Language & Technology, 1994.

Gauvain, J.L. et al, "The LIMSI Continuous Speech Dictation System: Evaluation on the ARPA Wall Street Journal Task", Proc. of the IEEE-ICASSP, 1994.

Gauvain, J.L. et al., "Speech recognition for an Information Kiosk", Proc. of ICSLP, 1996.

Glorianna Davenport, Thomas Aguirre Smith, Natalio Pincever, "Cinematic Primitives for Multimedia," Aug. 1991, IEEE Computer Graphics and Applications, vol. 11, No. 4, pp. 67-74.

Goddeau, D. et al., "Galaxy: A Human-Language Interface to On-Line Travel Information", Proc. of ICSLP, 1994.

Gran Turismo 3 ("GT3"), Sony Computer Entertainment, Released Apr. 28, 2001, User manual, pp. 7.

Gran Turismo 3 ("GT3"), Wikipedia, Release Date Apr. 28, 2001, pp. 1, accessed Aug. 5, 2009.

Gueziec, A. et al., "Simplicial Maps for Progressive Transmission of Polygonal Surfaces", Proceedings, VRML 98 Third Symposium on the Virtual Reality Modeling Language ACM, 1998, pp. 25-31, 131, New York, NY, USA.

Hayano, Masayuki, et al., "Mesh Simplification Using Edge Operation with Feature Detection", Inf. Proc. Soc. of Japan SIG Technical Report, Feb. 27, 1998, vol. 98, No. 16.

House, D., "Spoken-Language Access to Multimedia (SLAM): Masters Thesis", Oregon Graduate Inst., Dept. of CS and Eng., 1995.

http://www.nintendo.com/games/detail/1OTtO06SP7M52gi5m8pD6CnahbW8CzxE.

Internet.Com, "Graphical User Interface", available at http://www.webopedia.com; accessed Sep. 24, 2004. Last Modified May 17, 2004.

Konma, Toshihiro, "Rendering and Texture: Introduction to CG Creation in the Multimedia Age", Nikkei Bus. Pub., Inc. Nov. 1996, pp. 237 (Bump Mapping).

Lamel, L.F. et al., "Recent Developments in spoken Language systems for Information Retrieval", ESCA ETRW Spoken Dialog Systems, 1995.

Language Industry Monitor, "Janet Baker's Optimism", 1992.

Matsushita, Yasuyuki, "Special Effects: Interobject Reflection effect: Starting OpenGL Programming with Mesa 3D", Itsutsubachi Res. Co., Ltd., Jan. 2000, pp. 148-153.

Moller, T. & Haines, E., "Real-time rendering", 1999, pp. 69-81, A.K. Peters Ltd.

Mostow, Jack, et al., "Towards a Reading Coach That Listens: Automated Detection of Oral Reading Errors", Proc. of the 11th Ntl. Conf. on A.I., 1993.

Nakamura, Hiroko, et al., "Adaptive Transmission of Polygonal Patch Datasets . . . ", Inf. Proc. Soc. of Japan SIG Technical Report, Sep. 8, 2000, vol. 2000, No. 8.

Nayer, Shree K., et al., Lighting Sensitive Display, ACM Transactions on Graphics, Oct. 2004, vol. 23, No. 4, pp. 963-979, New York.

Peercy et al., "Interactive Multi-Pass Programmable Shading," Computer Graphics Proceedings, SIGGRAPH 2000, Jul. 2000.

Proudfoot et al., "A Real-Time Procedural Shading System for Programmable Graphics Hardware," Computer Graphics Proceedings, SIGGRAPH 2001, Aug. 2001.

Auslander et al., "Fast, Effective Dynamic Compilation," SIGPLAN Notices ACM, 1996.

McCool et al., "Texture Shaders," Eurographics Los Angeles, 1999.

Beshers et al., "Generating Efficient Virtual Worls for Visualization Using Partial Evaluation and Dynamic Compilation," ACM 1997.

Nvidia Corporation, "User Guide CgFX Plug-In for 3ds Max," Nov. 13, 2002.

Taylor, Philip, "The MSDN Shader Workshop Application, Part 1," Microsoft Corporation, Mar. 25, 2002.

Appeal Brief filed Feb. 1, 2008 for U.S. Appl. No. 10/959,695.

Examiner's Answer to Appeal Brief, Apr. 14, 2008.

Appeal Brief filed Jun. 16, 2008 for U.S. Appl. No. 10/959,695.

* cited by examiner

MULTI-PASS SHADING

CROSS-REFERENCE TO RELATED APPLICATION

The present application is a continuation and claims the priority benefit of U.S. patent application Ser. No. 10/959,695 entitled "Application Binary Interface for Multi-Pass Shaders" filed Oct. 6, 2004, the disclosure of which is incorporated herein by reference.

BACKGROUND

1. Field of the Invention

The present invention relates generally to computer graphics. More particularly, the present invention relates to systems and methods of controlling precompiled computer programs in computer graphics systems.

2. Background Art

Prior art computer graphics systems typically execute an application program, such as a computer video game program, to generate graphics images for display on a computer screen. One type of prior art computer graphics system includes an on-line compiler. In this type of computing system, the computer graphics system compiles portions of the application program while executing other portions of the application program in real time. In this way, a first portion of the application program executing in the computer graphics system can provide run time parameters for compiling a second portion of the application program.

In some situations, a portion of the application program written specifically for graphics hardware in the computer graphics system can be simplified by using run time parameters during compilation. For instance, a first portion of the application program may include a loop construct having a loop count parameter, and the compiler can unroll the loop construct based on a value of the loop count parameter provided by a second portion of the application program at run time. Including a compiler in the computer graphics system, however, increases the cost and complexity of the graphics computer system.

Another type of prior art computer graphics system executes precompiled application programs. In this type of computer graphics system, an application program is compiled into binary programs by using an off-line compiler. The binary programs are then provided to the computer graphics system, which executes the binary programs. Precompiling the application program avoids the need for an on-line compiler but may complicate portions of the application program written specifically for graphics hardware in the computer graphics system. Specifically, these portions of the application program may require fixed parameters at compile time.

One type of program typically found in an application program written for a computer graphics system is a shader. A shader generates visual effects for graphics objects. In many computer graphics systems, the shader controls multiple texture units in the graphics hardware, each of which can access samples from a texture. Moreover, the shader generates colors for the graphics object based on the textures accessed from the texture units.

Some shaders require a greater number of textures for creating a visual effect than the number of texture units available in the graphics hardware of a computer graphics system. Consequently, some compilers cannot compile these application programs for these computer graphics systems. Other compilers generate a multi-pass shader by breaking up the task of creating a visual effect into passes such that each pass requires no more texture units than the number of texture units available in the computer graphics system. Each pass of the multi-pass shader performs an operation on a graphics to generate a result. In this way, a pass of the multi-pass shader may perform an operation based on a result generated in a previous pass.

In those types of computer graphics systems that compile programs on-line, an application program can modify parameters of a shader to configure the shader at run time, which may simplify the task of programming the shader. In contrast, those computer graphics systems that rely on an off-line compiler may need to fix some parameters of the shader at the time of compilation (i.e., compile time). Consequently, the shader (i.e., the precompiled shader) is not configurable at run time, which may complicate the task of programming the shader.

In light of the above, there exists a need to simplify the task of programming a multi-pass shader. Additionally, these exists a need for a precompiled multi-pass shader that is configurable at run time.

SUMMARY OF THE CLAIMED INVENTION

An application binary interface addresses the need for simplifying the task of programming a multi-pass shader. Further, the application binary interface addresses the need for a precompiled multi-pass shader that is configurable at run time. For each pass of a multi-pass shader, the application binary interface specifies a binary shader, one or more parameters for the binary shader, and a graphics state. The graphics state for a first pass specifies an initial graphics state of a graphics object, and the graphics state of each subsequent pass specifies a change from the graphics state of a previous pass. The parameters link the binary shaders together so that a binary shader of a given pass can use a result generated by a binary shader of a previous pass. The binary application interface simplifies the task of programming the multi-pass shader by specifying the binary shaders, parameters for the binary shaders, and graphics states for the multi-pass shader in a binary file.

In one embodiment of the presently disclosed invention, a method for rendering an image with a graphics processor driven by a multi-pass shader program including a predetermined set of default steps is disclosed. Through the method, the multi-pass shader program is pre-complied to generate binary execution code for execution by the graphics processor. A first parameter of the image is received. A first pass of the multi-pass shader program is executed utilizing the binary execution code and the first parameter to obtain a first data value. At least one default step corresponding to a second pass of the multi-pass shader program is modified based upon the first data value. A second pass of the multi-pass shader is executed utilizing the binary execution code including the at least one default step as modified based upon the first data value to obtain a second data value. An operation is performed on the first data value and the second data value to obtain image rendering data. The image is then rendered, a portion of the image based upon the image rendering data. The multi-pass shader program effectuates a photorealistic effect in the portion of the image through the alteration of a color based on the angle and distance of an object with respect to a light source in the portion of the image.

In a second embodiment a further method for rendering an image with a graphics processor driven by a multi-pass shader program including a predetermined set of default steps is provided. The method includes pre-compiling the multi-pass shader program to generate binary execution code for execution by the graphics processor, receiving a first parameter of the image, and executing a first pass of the multi-pass shader program utilizing the binary execution code and the first parameter to obtain a first data value. A second parameter of the image is received and at least one default step of a second pass of the multi-pass shader program is modified based upon the second parameter. A second pass of the multi-pass shader program is executed utilizing the binary execution code including the at least one default step as modified based upon the second parameter to obtain a second data value and an operation is performed on the first data value and the second data value to obtain image rendering data. The image is rendered, a portion of the image based upon the image rendering data. The multi-pass shader program effectuates a photorealistic effect in the portion of the image through the alteration of a color based on the angle and distance of an object with respect to a light source in the portion of the image.

In a third claimed embodiment, a graphics processor driven by a multi-pass shader program including a predetermined set of default steps is disclosed. The graphics processor is configured to receive a first parameter of the image, execute a first pass of the multi-pass shader program utilizing binary execution code pre-compiled by the multi-pass shader, and the first parameter to obtain a first data value. The processor is further configured to modify at least one default step of a second pass of the multi-pass shader program based upon the first data value and execute a second pass of the multi-pass shader program utilizing the binary execution code including the at least one default step as modified based upon the first data value to obtain a second data value. An image is rendered in response to execution of the graphics processor, a portion of the image based upon the image rendering data. The multi-pass shader program effectuates a photorealistic effect in the portion of the image through the alteration of a color based on the angle and distance of an object with respect to a light source in the portion of the image.

DETAILED DESCRIPTION

According to one embodiment of the present invention, an application binary interface includes a descriptor for each pass of a multi-pass shader specifying a binary shader for the pass. The application binary interface also includes one or more parameters for the binary shader of each pass. Further, the application binary interface includes a graphics state of each pass. The graphics state of the first pass is an initial graphics state of a graphics object, and the graphics state of each subsequent pass specifies a change from the graphics state of a previous pass. The parameters link the binary shaders together such that a binary shader of a given pass can use a result generated by a binary shader of a previous pass. The binary shader of each pass is then executed based on the graphics state and the parameters of the pass to render the graphics object.

Figure 1:
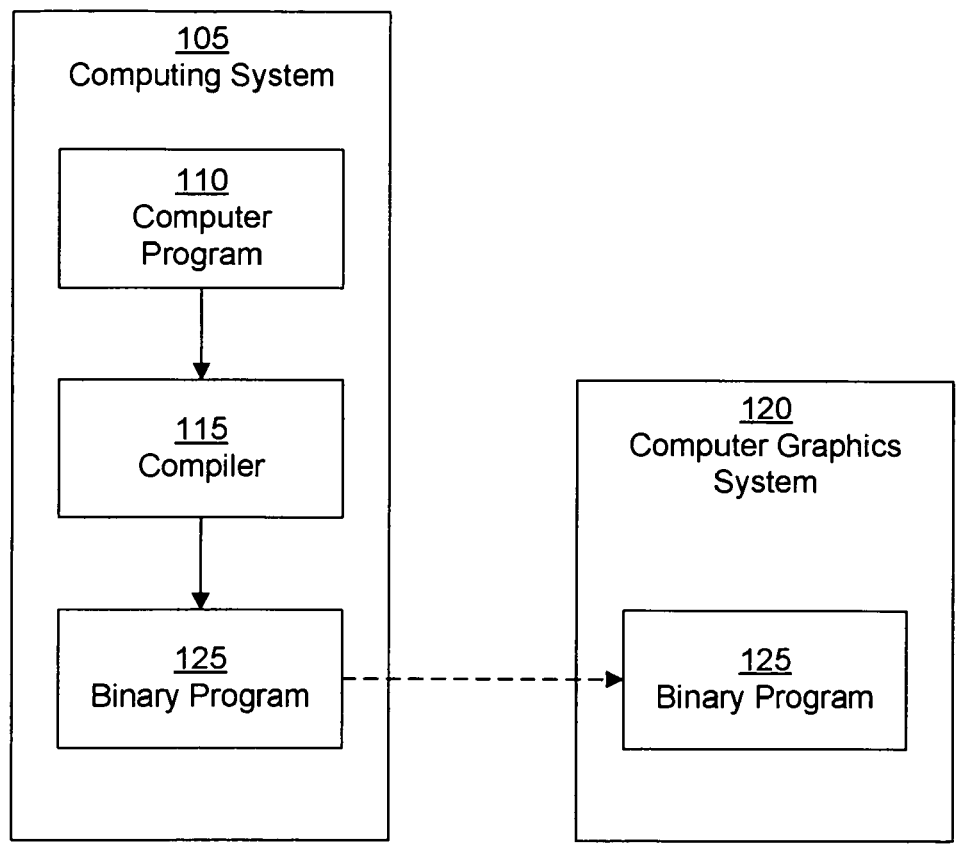
FIG. 1 is a block diagram of an exemplary computing environment, in accordance with one embodiment of the present invention.

FIG. 1 depicts an exemplary computing environment 100 in accordance with one embodiment of the present invention. The exemplary computing environment 100 includes a computing system 105 and a computer graphics system 120. The exemplary computing system 105 includes a computer program 110, a compiler 115, and a binary program 125. In operation, the computing system 105 executes the compiler 115 on the computer program 110 to generate the binary program 125. The binary program 125 is then provided to the computer graphics system 120. The computer graphics system 120 executes the binary program 125 and renders graphics images based on the binary program 125.

In one embodiment, the computer program 110 is a video game program. In this embodiment, the computer graphics system 120 executes the binary program 125 to render graphics images for the video game program. In another embodiment, the computing system 105 includes the computer graphics system 120.

Figure 2:
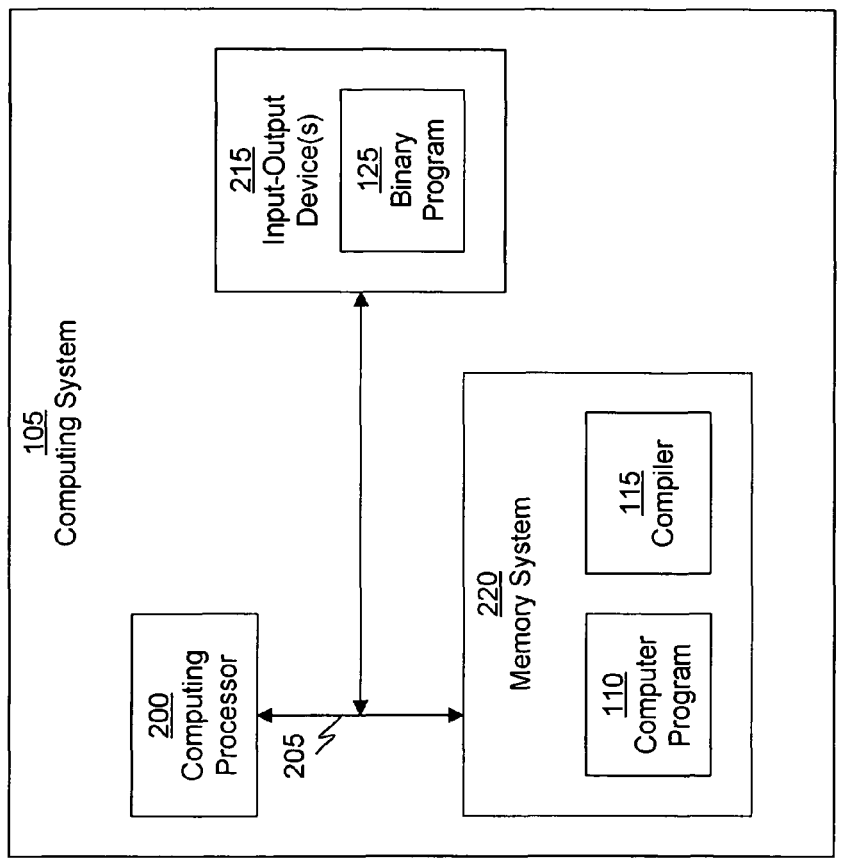
FIG. 2 is a block diagram of the exemplary computing system of FIG. 1.

FIG. 2 depicts the exemplary computing system 105 of FIG. 1. The exemplary computing system 105 includes a computing processor 200, input-output (I/O) device(s) 215, and a memory system 220 coupled in communication with each other via a communication bus 205. The memory system 220 stores the computer program 110 and the compiler 115. The computing processor 200 executes the compiler 115 on the computer program 110 to generate the binary program 125 and provides the binary program to the I/O device(s) 215.

In one embodiment, the binary program 125 includes computer program code stored on a compact disc read-only memory (CD-ROM). In another embodiment, the binary program 125 includes computer program code stored on a digital versatile disc (DVD). In still another embodiment, the binary program 125 includes computer program code stored on a portable memory device, such as a flash memory device.

Figure 3:
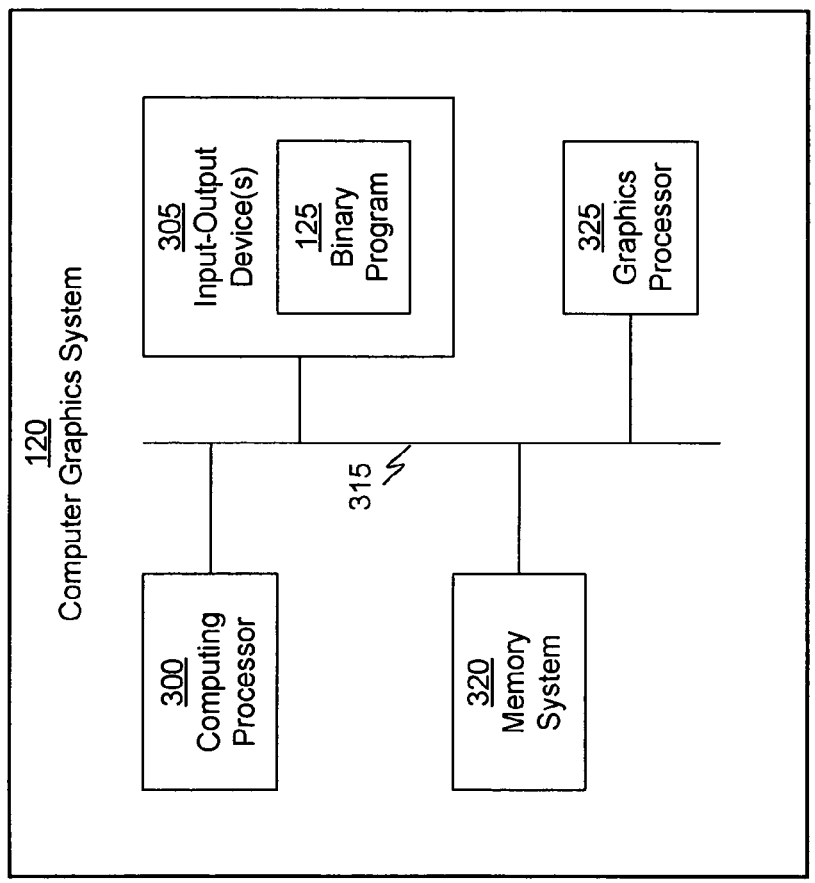
FIG. 3 is a block diagram of the exemplary computer graphics system of FIG. 1.

FIG. 3 depicts the exemplary computer graphics system 120 of FIG. 1. The exemplary computer graphics system 120 includes input-output (I/O) device(s) 305, a computing processor 300, a memory system 320, and a graphics processor 325 coupled in communication with each other via a communication bus 315. In this embodiment, the I/O device(s) 305 receives the binary program 125 and the computing processor 300 stores the binary program 125 into the memory system 320. The computing processor 300 and the graphics processor 325 then execute various portions of the binary program 125 stored in the memory system 320 to render graphics images, as is described more fully herein.

Figure 4:
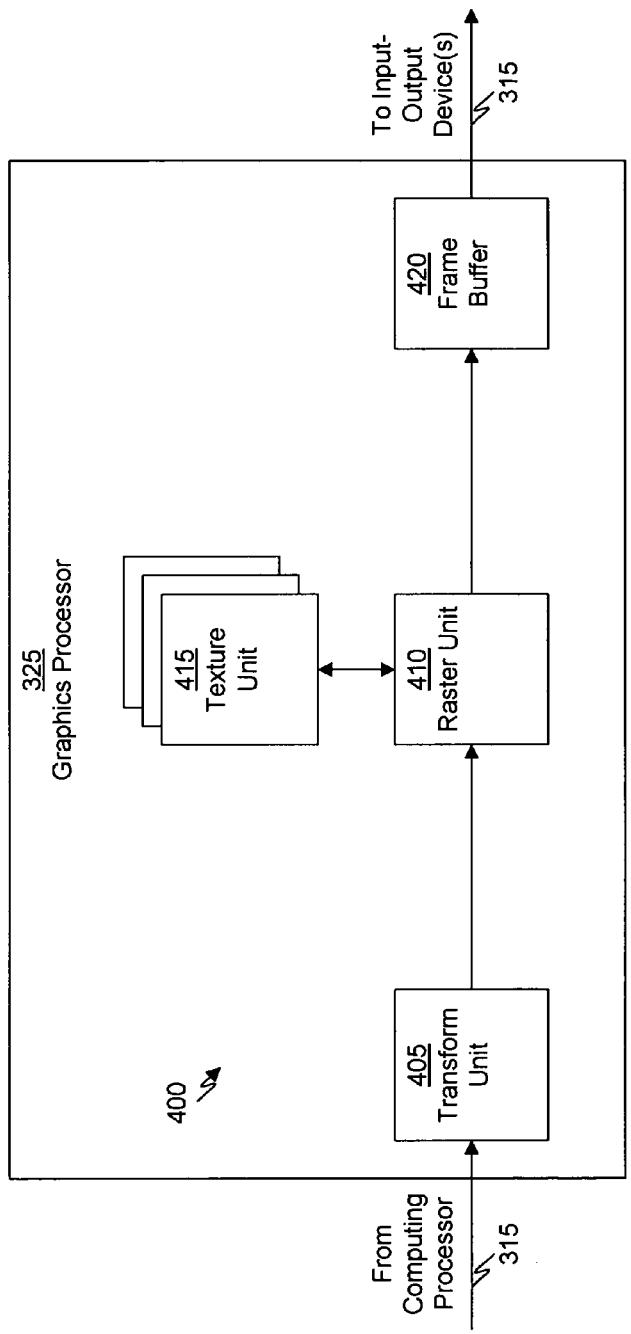
FIG. 4 is a block diagram of the exemplary graphics pipeline of FIG. 3.

FIG. 4 is a block diagram of the exemplary graphics processor 325 of FIG. 3. In this embodiment, the graphics processor 325 includes a graphics pipeline 400. The graphics pipeline 400 includes a transform unit 405, a raster unit 410, a texture unit 415, and a frame buffer 420. The transform unit 405 executes a vertex program to transform a graphics object into graphics primitives defined by vertices, such as lines and triangles. The raster unit 410 transforms the graphics primitives into pixels and generates a value for each pixel. Optionally, the texture unit 415 accesses samples from one or more textures and provides data based on the samples to the raster unit 410. In turn, the raster unit 410 generates the value for each pixel based on the data received from the texture unit 415. The frame buffer 420 stores the value of each pixel in the graphics object. In one embodiment, the value of each pixel represents a color of the pixel. In a further embodiment, the frame buffer 420 stores the value of each pixel in a graphics image composed of multiple graphics objects.

In one embodiment, the graphics pipeline 400 includes a plurality of texture units 415, each of which can access one or more textures. In this embodiment, each texture unit 415 concurrently generates an intermediate value for each pixel based on the texture accessed by the texture unit 415, and the raster unit 410 combines the intermediate values of the pixel to generate the value of the pixel. In another embodiment, the value of the pixel represents a color of the pixel.

Figure 5:
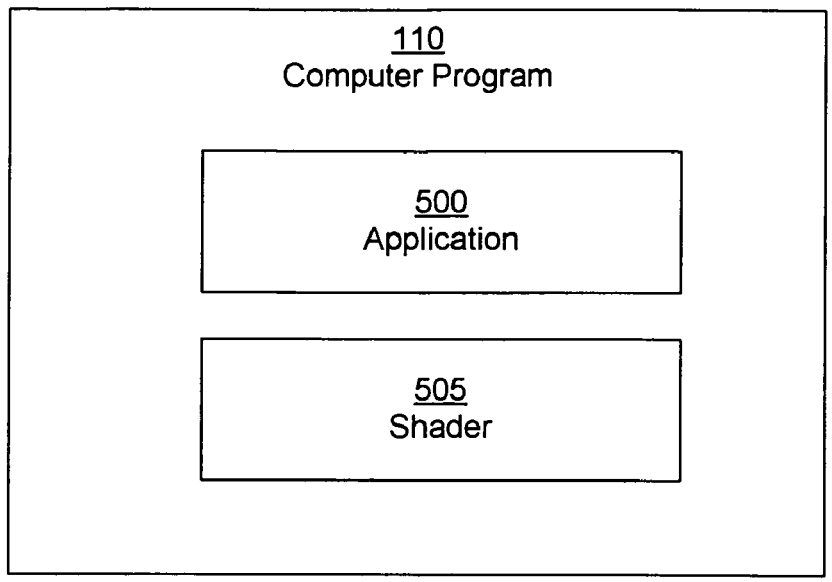
FIG. 5 is a block diagram of the exemplary application program of FIG. 1.

FIG. 5 depicts the exemplary computer program 110 of FIG. 1. The computer program 110 includes an application 500 (i.e., application program) and a shader 505 (i.e., a shader program). The shader 505 includes computing instructions for rendering a graphics object, and the application 500 includes instructions for invoking the shader 505 to render a graphics object. Further, the application 500 can include instructions for invoking multiple shaders 505 to render multiple graphics objects for a graphics image.

Figure 6:
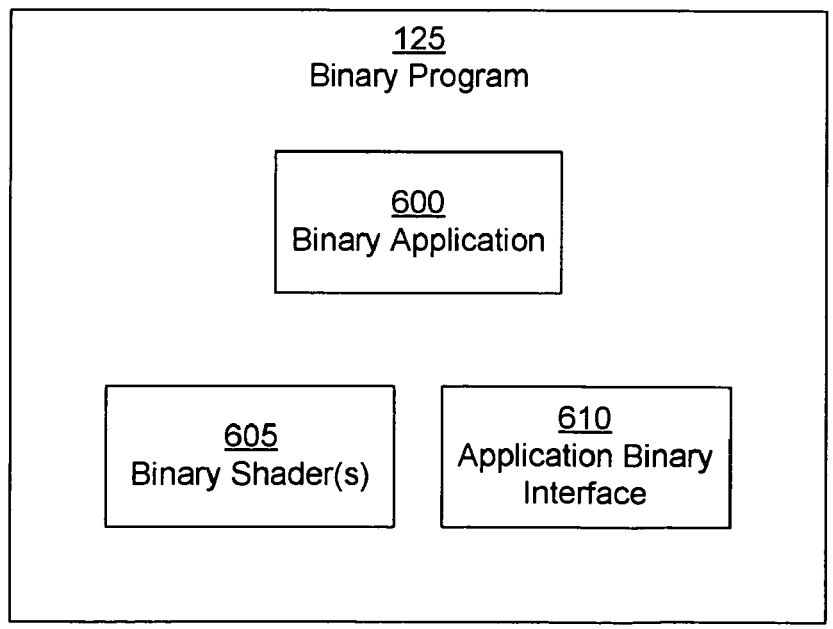
FIG. 6 is a block diagram of the exemplary binary program of FIG. 1.

FIG. 6 depicts the exemplary binary program 125 of FIG. 1. The binary program 125 includes a binary application 600 (i.e., a binary application program), one or more binary shaders 605 (i.e., binary shader programs) and an application binary interface 610. In this embodiment, the application binary interface 610 includes a descriptor for specifying a binary shader, one or more parameters for the binary shader, and a graphics state for each pass of a multi-pass shader. The graphics state of the first pass is an initial graphics state for a graphics object. The graphics state of each subsequent pass specifies a change from the graphics state of the previous pass. The parameters link the binary shaders together so that the binary shader of a given pass can use a result generated by the binary shader of a previous pass. For example, an input parameter of the binary shader of the given pass can be an output parameter of the binary shader of the previous pass. In this way, the passes of the multi-pass shader can be executed to render the graphics object. In a further embodiment, the passes of the multi-pass shaders are arranged in serial form. In this embodiment, a subsequent pass of the multi-pass shaders follows a previous pass of the multi-pass shader.

In one embodiment, the compiler 115 (FIG. 1) compiles the shader 505 (FIG. 5) to generate an expression for rendering a graphics object. Subsequently, the compiler 115 identifies subexpressions in the expression such that each subexpression can be executed by the graphics processor 325 (FIG. 3) in a single pass. The compiler 115 then generates the binary shader 605, one or more parameters for the binary shader, and the graphic state for each subexpression. In this embodiment, the graphics states link the binary shaders 605 together so that the graphics processor 325 can execute the binary shaders 605 to render the graphics object. For example, a binary shader 605 can store data in a location (e.g., a texture unit or frame buffer) in the graphics processor 325 and a graphics state can specify that location. Another binary shader 605 can then determine the location of the data based on the graphics state.

In another embodiment, a graphics state can specify characteristics of the computer graphics system 120 (FIG. 3) or a graphics image. For example, the graphics state can specify a number of texture units available in the graphics processor 325. As another example, the graphics state can specify a pixel size of the graphics image. In still another example, the graphics state can specify a texture program to be executed by the graphics processor 325 on the graphics object.

According to an exemplary embodiment, the application 500 (FIG. 5) includes computing instructions for invoking a shader 505 via the application binary interface 610. In this embodiment, the computing instructions include one or more variables, each of which corresponds to a parameter in the application binary interface 610. Consequently, the binary application 600 can determine the value of a variable and bind the value of the variable to the corresponding parameter at run time. In this way, the binary application 600 configures a multi-pass shader at run time based on the value of the variable.

In another embodiment, the value of a variable is limited to a predetermined set of values in the application 500. In this embodiment, the compiler 115 generates a binary shader 605 for each value in the predetermined set by setting the parameter to the value. In this way, the parameter of each binary shader 605 is fixed at compile time. The binary application 600 then determines the value of the variable at run time to select the binary shader 605 identified by the value of the variable. In this way, the binary application 600 configures a multi-pass shader at run time based on the value of the variable.

A representation of a shader, a multi-pass shader, and an exemplary application binary interface 610 for the multi-pass shader is depicted in Table 1. As depicted in Table 1, the shader is represented by the expression "output=cosine (texture_lookup(x,y))" in which "x" and "y" are input parameters and "output" represents an output value of the shader. The first pass of the multi-pass shader is represented by the subexpression "tmp=texture_lookup(x, y)" and the second pass is represented by the subexpression "output=cosine(tmp)." In the first pass, "x" and "y" are input parameters and "tmp" represents an output value of the first pass. In the second pass, "tmp" is an input parameter and "output" represents an output value of the second pass.

As is also depicted in table 1, the application binary interface 610 specifies the first pass and the second pass of the multi-pass shader. For the first pass, a descriptor is represented by "texture_lookup", which identifies a binary shader for the first pass. Further, input parameters for the binary shader of the first pass are represented by "x" and "y", and an output parameter for the binary shader of the first pass is represented by "tmp". The output parameter "tmp" represents an output value for the binary shader of the first pass. Further, in this embodiment, the output value for the binary shader of the first pass is a result for the first pass. Additionally, an initial graphics state for a graphics object is represented by "texture unit 1", which specifies that a first texture unit will access a texture for the binary shader of the first pass.

For the second pass, a descriptor is represented by "cosine", which represents a binary shader for the second pass. Further, an input parameter for the binary shader of the second pass is represented by "tmp", which is the output parameter of the first pass. Accordingly, the input parameter "tmp" for the binary shader of the second pass represents the output value of the binary shader of the first pass. Additionally, a graphics state of the second pass is represented by "frame buffer", which specifies that the result of the second pass will be stored in a frame buffer. In this way, the graphics state of the second pass specifies a change from the graphics state of the first pass. Further, the parameter "tmp" links the binary shader of the second pass to the binary shader of the first pass such that the result of the first pass is an input parameter for the binary shader of the second pass. The output parameter "output" represents an output value for the binary shader of the second pass. Further, in this embodiment, the output value for the binary shader of the second pass is a result for the second pass.

TABLE 1

| Shader |  |
|---|---|
| output = cosine (texture_lookup (x, y)) | |
| multi-pass shader | |
| first pass: tmp = texture_lookup (x, y) | |
| second pass: output = cosine (tmp) | |
| application binary interface | |
| first pass: | descriptor = texture_lookup |
|  | input parameter(s) = x, y |
|  | output parameter(s) = tmp |
|  | graphics state = texture unit 1 |
| second pass: | descriptor = cosine |
|  | input parameter(s) = tmp |
|  | output parameter(s) = output |
|  | graphics state = frame buffer |

Figure 7:
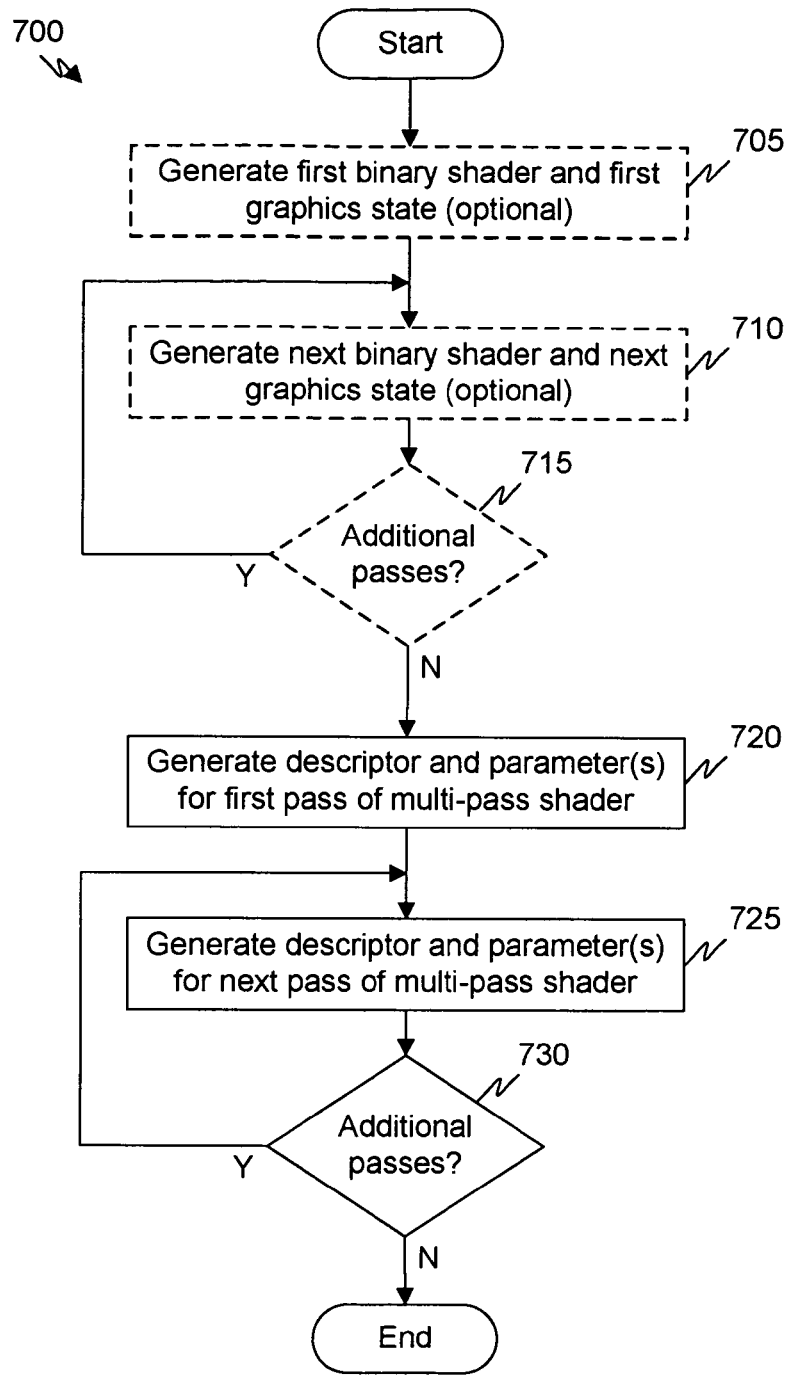
FIG. 7 is a flow chart for a method of generating an application binary interface, in accordance with one embodiment of the present invention.

FIG. 7 depicts a flow chart for a method 700 of generating the application binary interface 610 (FIG. 6), in accordance with one embodiment of the present invention. In step 705, the compiler 115 (FIG. 1) compiles the shader 505 (FIG. 5) to generate a first binary shader 605 (FIG. 6) and a first graphics state for a first pass of a multi-pass shader. In one embodiment, the compiler 115 compiles the application 500 (FIG. 5) together with the shader 505 to generate the first binary shader 605. It is to be appreciated that step 705 is optional in the present invention.

In step 710, the compiler 115 compiles the shader 505 to generate the next binary shader 605 and the next graphics state for the next pass of a multi-pass shader. In one embodiment, the compiler 115 compiles the application 500 together with the shader 505 to generate the binary shader 605 and the graphics state for this next pass. It is to be appreciated that step 710 is optional in the present invention.

In another embodiment, the compiler 115 performs steps 705 and 710 concurrently to generate the binary shader 605 and the graphics state for each pass of the multi-pass shader. In a further embodiment, the compiler 115 also generates the binary application 600 (FIG. 6).

In step 715, the compiler 115 determines whether the multi-pass shader includes additional passes. If the multi-pass shader includes additional passes, the method returns to step 710, otherwise the method proceeds to step 720. It is to be appreciated that step 715 is optional in the present invention.

In step 720, the compiler 115 generates a descriptor and one or more parameters for the first pass of the multi-pass shader. The descriptor of the first pass specifies the first binary shader. In one embodiment, the compiler 115 binds at least one parameter of the first pass to the first binary shader 605 at compile time. In another embodiment, the binary application 600 (FIG. 6) binds at least one parameter of the first pass to the first binary shader 605 at run time. In still another embodiment, the compiler 115 binds some of the parameters of the first pass to the first binary shader 605 at compile time and the binary application 600 binds some of the parameters of the first pass to the first binary shader 605 at run time.

In step 725, the compiler 115 generates a descriptor and one or more parameters for the next pass of the multi-pass shader. The descriptor of this pass specifies the binary shader of this pass. In one embodiment, the compiler 115 binds at least one parameter of this pass to the binary shader 605 of this pass at compile time. In another embodiment, the binary application 600 binds at least one parameter of this pass to the binary shader 605 at run time. In still another embodiment, the compiler 115 binds some of the parameters of this pass to the binary shader at compile time and the binary application 600 binds some of the parameters of this pass to the binary shader at run time.

In step 730, the compiler 115 determines whether the multi-pass shader includes additional passes. If the multi-pass shader includes additional passes, the method returns to step 725, otherwise the method ends. It is to be appreciated the application binary interface 610 comprises the parameter(s) generated for each pass of the multi-pass shader.

In one embodiment, the compiler 115 can perform steps 720-730 concurrently to generate the parameters(s) for each pass of the multi-pass shader. In another embodiment of the present invention, the compiler 115 can perform steps 705-730 concurrently to generate the binary shader 605, the graphics state, and the parameter(s) for each pass of the multi-pass shader. In a further embodiment, the compiler can also generate the binary application 600. In still another embodiment, the compiler 115 can perform steps 705 and 720 concurrently. In yet another embodiment, the compiler can perform steps 710 and 725 concurrently.

Figure 8:
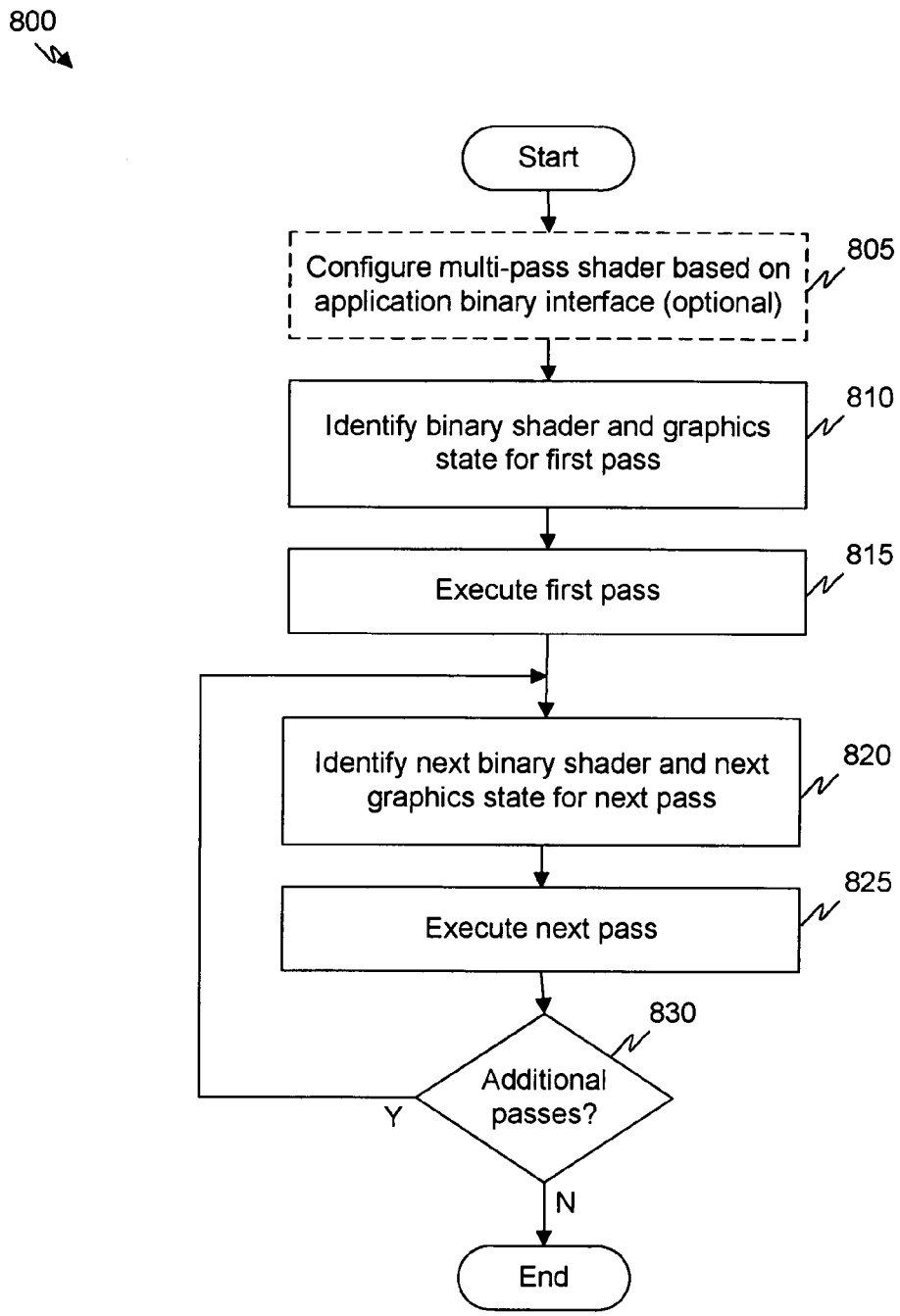
FIG. 8 is a flow chart for a method of rendering a graphic object by using an application binary interface, in accordance with one embodiment of the present invention.

FIG. 8 depicts a flow chart for a method 800 of rendering a graphics object by using the application binary interface 610 (FIG. 6), in accordance with one embodiment of the present invention. In step 805, the binary application 600 (FIG. 6) configures a multi-pass shader. In one embodiment, the binary application 600 modifies at least one parameter of the application binary interface 610 at run time (i.e. during execution of the binary application 600) to configure the multi-pass shader. In another embodiment, the binary application 600 configures the multi-pass shader by selecting an application binary interface 610 among multiple application binary interfaces 610 based on one or more parameters at run time. It is to be appreciated that step 805 is optional in the present invention.

In step 810, the binary application 600 identifies the binary shader 605 (FIG. 6) and the graphics state for a first pass of a multi-pass shader based on the application binary interface 610. In one embodiment, the descriptor of the first pass specifies the binary shader 605 of the first pass. In this embodiment, the binary application 600 identifies the binary shader 605 of the first pass based on the descriptor of the first pass. In another embodiment, the descriptor specifies a plurality of binary shaders 605. In this embodiment, the binary application 600 selects the binary shader 605 of the first pass from the plurality of binary shaders 605 at run time based on one or more parameters for the binary shader 605 of the first pass in the application binary interface 610.

In step 815, the graphics processor 325 executes the first pass of the multi-pass shader by executing the first binary shader 605 based on the first graphics state to generate a result for the first pass. In one embodiment, the result for the first pass is a value of each pixel in the graphics object. In a further embodiment, the graphics processor 325 (FIG. 3) includes multiple texture units, each of which can access a texture. In this further embodiment, the graphics processor 325 executes the first binary shader on the multiple texture units in the graphics processor 325 to generate the value for each pixel based on the textures accessed by the texture units.

In step 820, the binary application 600 identifies the binary shader 605 and the graphics state for the next pass of the multi-pass shader based on the application binary interface 610. In one embodiment, the descriptor of this pass specifies the binary shader 605 of the pass. In this embodiment, the binary application 600 identifies the binary shader 605 of this pass based on the descriptor of this pass. In another embodiment, the descriptor specifies a plurality of binary shaders 605. In this embodiment, the binary application 600 selects the binary shader 605 of this pass from the plurality of binary shaders 605 at run time based on one or more parameters for the binary shader 605 of this pass in the application binary interface 610. In a further embodiment, some or all of the parameters for the binary shader 605 of this pass may be a result of a previous pass.

In step 825, the graphics processor 325 executes this next pass of the multi-pass shader by executing the binary shader 605 based on the graphics state to generate a result for this pass. In one embodiment, the result for this pass is a value of each pixel in the graphics object. In a further embodiment, the graphics processor 325 includes multiple texture units, each of which can access a texture. In this further embodiment, the graphics processor 325 executes the binary shader on the multiple texture units in the graphics processor 325 to generate the value for each pixel based on the textures accessed by the texture units.

In another embodiment, the graphics processor 325 generates the value of each pixel based on the value of the pixel generated in a previous pass. In this embodiment, the graphics state of this pass specifies the texture unit storing the intermediate color of each pixel generated in the previous pass. Consequently, the binary shader 605 of the current pass can access the value of the pixel generated in the previous pass to generate the value of the pixel for this pass. In a further embodiment, the value of the pixel generated for the last pass of the multi-pass shader is a color of the pixel. In another further embodiment, the graphics processor 325 stores the value of each pixel for each pass into the frame buffer 420 (FIG. 4) and then combines the values of each pixel to generate a color for the pixel in the frame buffer 420.

In step 830, the binary application 600 determines whether the multi-pass shader includes an additional pass based on the application binary interface 610. If the multi-pass shader includes an additional pass, the method returns to step 820, otherwise the method ends.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method for rendering an image with a graphics processor driven by a multi-pass shader program including a descriptor and an input parameter, the method comprising:
   pre-compiling, before run time, the multi-pass shader program to generate binary execution code for execution by the graphics processor by configuring a binary shader for each value in a predetermined set of values, wherein a variable of each binary shader is fixed at compile time to one of the predetermined values in the set;
   receiving a first parameter of the image, a value of the first parameter being limited to one of the values in the predetermined set of values in the multi-pass shader program;
   executing a first pass of the multi-pass shader program utilizing the binary execution code and the first parameter as the input parameter to obtain a first data value wherein the multi-pass shader program selects, at run-time, the binary shader comprising the binary execution code identified by the value of the first parameter in the first pass;
   binding, at run time, the first data value as the input parameter for a second pass of the multi-pass shader program;
   executing a second pass of the multi-pass shader program utilizing the binary execution code including the bound first data value to obtain a second data value;
   performing an operation on the first data value and the second data value to obtain image rendering data; and
   rendering the image, a portion of the image based upon the image rendering data, and wherein the multi-pass shader program effectuates a photorealistic effect in the portion of the image through the alteration of a color based on the angle and distance of an object with respect to a light source in the portion of the image.

2. The method of claim 1, wherein the operation includes modifying the first data value and the second data value.

3. The method of claim 1, wherein the first parameter of the image indicates the color to be applied to the portion of the image.

4. The method of claim 1, wherein the first parameter of the image indicates corresponds to a specified position of the light source.

5. The method of claim 1, further comprising:
   executing a texture mapping operation;
   applying the results of the texture mapping operation to an object in the rendered image.

6. The method of claim 1, wherein rendering the image occurs without the use of a texture mapping operation.

7. A method for rendering an image with a graphics processor driven by a multi-pass shader program including a descriptor and an input parameter, the method comprising:
   pre-compiling, before run time, the multi-pass shader program to generate binary execution code for execution by the graphics processor by configuring a binary shader for each value in a predetermined set of values, wherein a variable of each binary shader is fixed at compile time to one of the predetermined values in the set;
   receiving a first parameter of the image, a value of the first parameter being limited to one of the values in the predetermined set of values in the multi-pass shader program;
   executing a first pass of the multi-pass shader program utilizing the binary execution code and the first parameter as the input parameter to obtain a first data value wherein the multi-pass shader program selects, at run-time, the binary shader comprising the binary execution code identified by the value of the first parameter in the first pass;
   receiving a second parameter of the image;
   binding, at run time, the first data value as the input parameter for a second pass of the multi-pass shader program;
   executing a second pass of the multi-pass shader program utilizing the binary execution code including both the second parameter and the bound first data value to obtain a second data value;
   performing an operation on the first data value and the second data value to obtain image rendering data; and
   rendering the image, a portion of the image based upon the image rendering data, and wherein the multi-pass shader program effectuates a photorealistic effect in the portion of the image through the alteration of a color based on the angle and distance of an object with respect to a light source in the portion of the image.

8. The method of claim 7, wherein the operation includes modifying the first data value and the second data value.

9. The method of claim 7, wherein the first parameter indicates that a portion of the image is to be treated as if it is illuminated by a first light source at a first specified position and the second parameter indicates that the portion of the image is to be treated as if it is illuminated simultaneously by a second light source at a second specified position.

10. The method of claim 9, wherein the image rendering data results in the portion of the image being rendered as if it were illuminated by a first light source located at the first specified position and by a second light source at the second specified position.

11. The method of claim 7, further comprising:
    executing a texture mapping operation;
    applying the results of the texture mapping operation to an object in the rendered image.

12. The method of claim 7, wherein rendering the image occurs without the use of a texture mapping operation.

13. A graphics processor driven by a multi-pass shader program including a descriptor and an input parameter, the graphics processor configured to:
    pre-compile, before run time, the multi-pass shader program to generate binary execution code for execution by the graphics processor by configuring a binary shader for each value in a predetermined set of values, wherein a variable of each binary shader is fixed at compile time to one of the predetermined values in the set;
    receive a first parameter of the image, a value of the first parameter being limited to one of the values in the predetermined set of values in the multi-pass shader program;
    execute a first pass of the multi-pass shader program utilizing binary execution code pre-compiled by the multi-pass shader, before run time, and further utilizing the first parameter as the input parameter to obtain a first data value wherein the multi-pass shader program selects, at run-time, the binary shader comprising the binary execution code identified by the value of the first parameter in the first pass;
    bind, at run time, the first data value as the input parameter for a second pass of the multi-pass shader program; and
    execute a second pass of the multi-pass shader program utilizing the binary execution code including the bound first data value to obtain a second data value, wherein an image is rendered in response to execution of the graphics processor, a portion of the image based upon the image rendering data, and wherein the multi-pass shader program effectuates a photorealistic effect in the portion of the image through the alteration of a color based on the angle and distance of an object with respect to a light source in the portion of the image.

14. A method for rendering an image with a graphics processor driven by a multi-pass shader program including a descriptor and an input parameter, the method comprising:
    pre-compiling, before run time, the multi-pass shader program to generate binary execution code for execution by the graphics processor by configuring a binary shader for each value in a predetermined set of values, wherein a variable of each binary shader is fixed at compile time to one of the predetermined values in the set, wherein binary execution code is identified by the descriptor;
    receiving a first parameter of the image, a value of the first parameter being limited to one of the values in the predetermined set of values in the multi-pass shader program;
    executing a first pass of the multi-pass shader program utilizing the binary execution code and the first parameter as the input parameter to obtain a first data value wherein the multi-pass shader program selects, at run-time, the binary shader comprising the binary execution code identified by the value of the first parameter in the first pass;
    binding, at run time, the first data value as the descriptor for a second pass of the multi-pass shader program;
    executing a second pass of the multi-pass shader program utilizing the binary execution code including the bound first data value to obtain a second data value;
    performing an operation on the first data value and the second data value to obtain image rendering data; and
    rendering the image, a portion of the image based upon the image rendering data, and wherein the multi-pass shader program effectuates a photorealistic effect in the portion of the image through the alteration of a color based on the angle and distance of an object with respect to a light source in the portion of the image.

15. A computer implemented memory having embodied thereon a program, the program being executable by a processor to perform a method for rendering an image, the method comprising:
    pre-compiling, before run time, a multi-pass shader program including a descriptor and an input parameter to generate binary execution code for execution by the processor by configuring a binary shader for each value in a predetermined set of values, wherein a variable of each binary shader is fixed at compile time to one of the predetermined values in the set;
    receiving a first parameter of the image, a value of the first parameter being limited to one of the values in the predetermined set of values in the multi-pass shader program;
    executing a first pass of the multi-pass shader program utilizing the binary execution code and the first parameter as an input parameter to obtain a first data value wherein the multi-pass shader program selects, at run-time, the binary shader comprising the binary execution code identified by the value of the first parameter in the first pass;
    binding, at run time, the first data value as the input parameter for a second pass of the multi-pass shader program;
    executing a second pass of the multi-pass shader program utilizing the binary execution code including the bound first data value to obtain a second data value;
    performing an operation on the first data value and the second data value to obtain image rendering data; and
    rendering the image, a portion of the image based upon the image rendering data, and wherein the multi-pass shader program effectuates a photorealistic effect in the portion of the image through the alteration of a color based on the angle and distance of an object with respect to a light source in the portion of the image.

* * * * *

UNITED STATES PATENT AND TRADEMARK OFFICE
CERTIFICATE OF CORRECTION

PATENT NO. : 8,289,325 B2  Page 1 of 1
APPLICATION NO. : 12/287317
DATED : October 16, 2012
INVENTOR(S) : Robin James Green et al.

It is certified that error appears in the above-identified patent and that said Letters Patent is hereby corrected as shown below:

On the title page, item (73)
Assignee's name should be: "Sony Computer Entertainment Inc., Tokyo (JP)"

Signed and Sealed this
Nineteenth Day of February, 2013

Teresa Stanek Rea
*Acting Director of the United States Patent and Trademark Office*